United States Patent
Susairaj et al.

(10) Patent No.: US 8,832,028 B2
(45) Date of Patent: Sep. 9, 2014

(54) DATABASE CLONING

(75) Inventors: Margaret Susairaj, Sugar Land, TX (US); Sumanta K. Chatterjee, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/218,306

(22) Filed: Aug. 25, 2011

(65) Prior Publication Data

US 2013/0054531 A1 Feb. 28, 2013

(51) Int. Cl.
*G06F 17/30* (2006.01)
*G06F 11/20* (2006.01)

(52) U.S. Cl.
CPC ...... *G06F 17/30306* (2013.01); *G06F 11/2061* (2013.01)
USPC ...................................................... 707/640

(58) Field of Classification Search
USPC ................................................. 707/640, 660
See application file for complete search history.

(56) References Cited

U.S. PATENT DOCUMENTS

| | | | |
|---|---|---|---|
| 7,590,660 B1 | 9/2009 | Richards | |
| 7,634,505 B2 | 12/2009 | Chasman | |
| 7,885,922 B2 | 2/2011 | Pareek | |
| 7,890,508 B2 | 2/2011 | Gerber | |
| 8,423,733 B1 * | 4/2013 | Ozdemir | 711/162 |
| 2005/0033803 A1 * | 2/2005 | Vleet et al. | 709/203 |
| 2005/0246397 A1 | 11/2005 | Edwards | |
| 2006/0047720 A1 | 3/2006 | Kulkarni | |
| 2006/0136490 A1 * | 6/2006 | Aggarwal et al. | 707/103 R |
| 2007/0043749 A1 | 2/2007 | Gerber | |
| 2008/0097961 A1 | 4/2008 | Dias | |
| 2008/0162491 A1 | 7/2008 | Becker | |
| 2009/0204583 A1 * | 8/2009 | Hechler et al. | 707/3 |

OTHER PUBLICATIONS

Ron Haupert et al., "A Guide to Cloning IMS Systems and Refreshing IMS Databases", Document version 1.0, WebSphere software, Jun. 2009.
Broder, Andrei et al., "Network Applications of Bloom Filters: A Survey" Internet Mathematics vol. 1, No. 4, 2004, pp. 485-509.
Aiken, William et al., "MYSQL Guide for SUN Storage 7000 Unified Storage System" 2009, Business Systems International, Sun BluePrints Online.
Lightstone, Sam S. et al., "Toward Automatic Computing with DB2 Universal Database" 2002.

(Continued)

*Primary Examiner* — Robert Beausoliel, Jr.
*Assistant Examiner* — Nirav K Khakhar
(74) *Attorney, Agent, or Firm* — Shun Yao; Park, Vaughan, Fleming & Dowler LLP

(57) ABSTRACT

A database management system (DBMS) maintains a clone database in a clone space without storing an entire copy of the database and without requiring a snapshot function from an underlying storage device. This DBMS may receive a database command to access a data block of the clone database, and may determine whether the data block is stored in the clone space. If the data block is not stored in the local clone space, the DBMS may receive the data block from a backup copy of the database. If the database command comprises a write operation, the DBMS may perform the write operation to update the data block, and may store the updated data block in the clone space. Also, if the database command comprises a read operation, the DBMS may perform the read operation on the data block received from the backup copy of the database.

21 Claims, 8 Drawing Sheets

(56) References Cited

OTHER PUBLICATIONS

Meister, Dirk et al., "dedupv1: Improving Deduplication Throughput using Solid State Drives (SSD)" IEEE, 2010.
Hitachi Data Systems, Products: Hitachi Copy-on-Write Snapshot Software, http://www.hds.com/products/storage-software/copy-on-write-snapshot.html, 2011, pp. 1-2.
Garimella, Neeta "Understanding and exploiting snapshot technology for data protection, Part 1: Snapshot technology overview", pp. 1-7, Apr. 26, 2006, http://www.ibm.com/developerworks/tivoli/library/t-snaptsm1/index.html.
IMB, "Cloning IBM FileNet Content Engine data from one IBM FileNet P8 domain to another", pp. 1-6, Jan. 7, 2011, https://www-304.ibm.com/support/docview.wss?uid=swg21443296.

* cited by examiner

DATABASE CLONING

BACKGROUND

1. Field of the Invention

The present disclosure relates to database cloning. More specifically, the present disclosure relates to a method and system for maintaining a clone database in a clone space without storing an entire copy of the database.

2. Related Art

Software developers oftentimes wish to test upgrades to an application using real-world data, for example, from a production database. Unfortunately, it is not safe to run an experimental version of the application using the production database because it may cause undesired modifications to the production database. Thus, some developers may clone the production database into a development or test environment that may exist on a separate server from the production database, and may use the database clone to test the experimental version of the application.

Currently, database cloning can be achieved by performing a bit-by-bit copy of the complete production data. Unfortunately, such a cloned database consumes as much disk space as the production database. Therefore, because the production database usually holds a vast amount of data, the size of the production database can require the database cloning operation to take an undesirable amount of time to perform. Further, the size of the production database can prohibit the developer from creating multiple database clones for the development or test environment.

As an alternative to cloning the production database, the developer may use functionality provided by a storage vendor to obtain a snapshot of the production database files. However, the database snapshot needs to exist on the same server instance as the production database and is dependent on the underlying storage device.

SUMMARY

One embodiment of the present invention provides a database management system (DBMS) that maintains a clone database in a clone space without storing an entire copy of the database and without requiring a snapshot function from an underlying storage device. This DBMS may receive a database command to access a data block of the clone database, and may determine whether the data block is stored in the clone space. If the data block is not stored in the local clone space, the DBMS may receive the data block from a backup copy of the database. Further, if the database command comprises a write operation, the DBMS may perform the write operation to update the data block, and may store the updated data block in the clone space. Also, if the database command comprises a read operation, the DBMS may perform the read operation on the data block received from the backup copy of the database, without storing the received data block in the local clone space.

In a variation on this embodiment, the DBMS may determine that the data block is not stored in the clone space by determining bit positions of a Bloom filter based on a data block address (DBA), and determining that the Bloom filter indicates, at the bit positions, that the data block is not stored in the clone space.

In a further variation, when the DBMS stores the updated data block in the clone space, the DBMS may set the Bloom filter, at the bit positions, to a value indicating that the updated data block is stored in the clone space.

In a variation on this embodiment, the DBMS may receive a cloning command to create the clone database, such that the cloning command may indicate a name for the clone database and access information for the database. Further, when the DBMS creates the clone database, the DBMS may include in the clone database a reference to the database being cloned.

In a variation on this embodiment, the DBMS may maintain the clone space without relying on storage-specific commands provided by the underlying storage device.

In a variation on this embodiment, the clone space resides on a computer system which is separate from a computer system where the backup copy of the database resides.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

In embodiments of this disclosure, the problem of creating multiple database clones that consume minimal disk space is solved by providing a database management system (DBMS) that maintains a clone database in a clone space without storing an entire copy of the database. This DBMS may perform thin provisioning on the clone database to store data blocks that have been modified from, for example, a production database (or a backup copy thereof). Further, the DBMS may implement copy-on-write to store a data block in the clone space, and thus does not require the use of a snapshot function from an underlying storage device of the production database.

For example, a developer can create a backup copy of the production database, and can use the DBMS to create and manage a plurality of clone databases to the backup database for testing an experimental version of an application. Further, because the clone database stores only data blocks that have been modified from the database, the developer can create separate clone databases for different test scripts of the application. Thus, the developer can perform a plurality of test scripts in parallel without having one test script influence the output generated by other test scripts.

The term "clone space" refers to database records that are associated with the clone database. Some database records are not stored in the clone space, and may be obtained from a source database. Further, some database records of the clone space (e.g., a database record of the source database that has been updated within the clone space) may be physically stored in a database file for the clone database.

Exemplary Computing System

Figure 1:
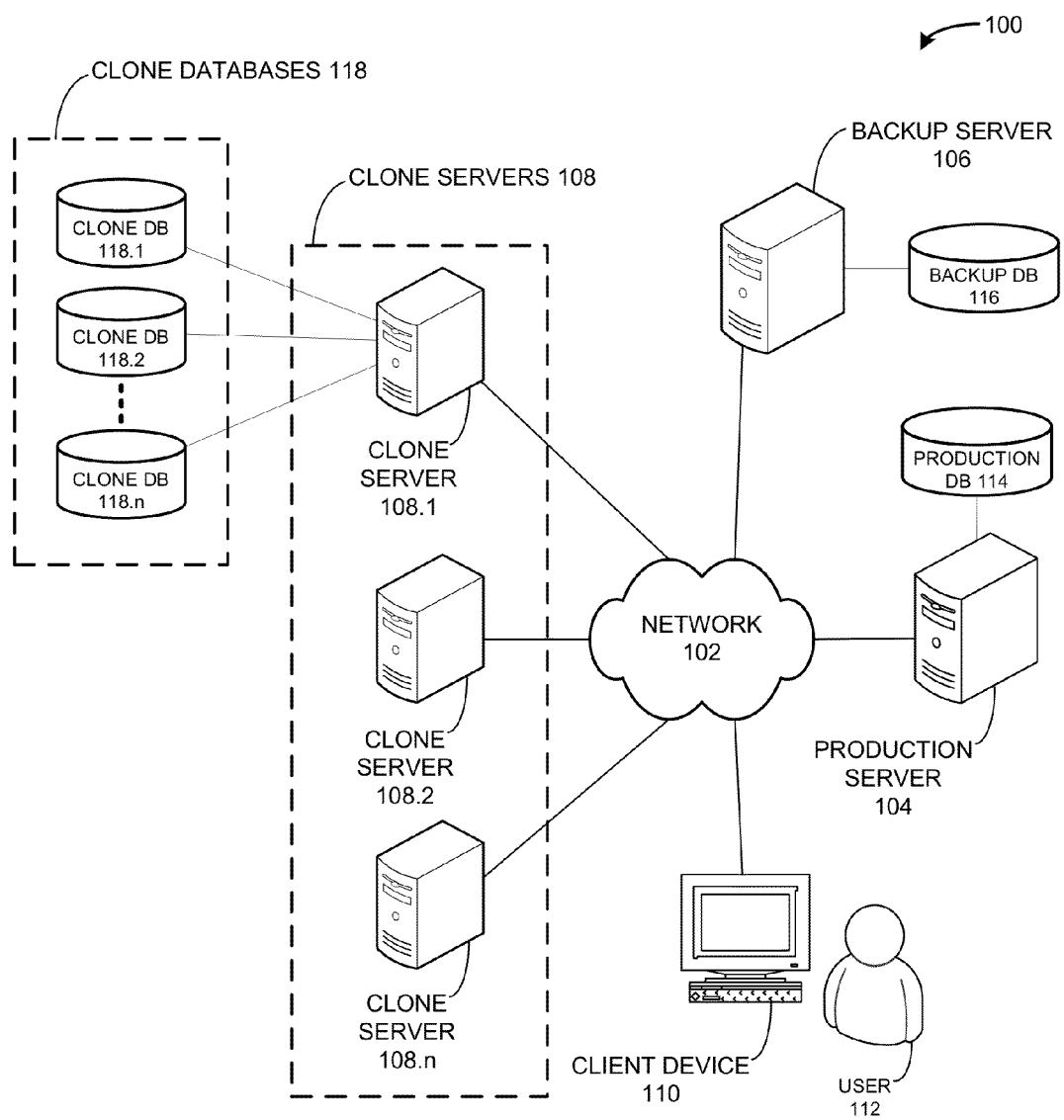
FIG. 1 illustrates an exemplary computing system in accordance with an embodiment of the present invention.

FIG. 1 illustrates an exemplary computing system 100 in accordance with an embodiment of the present invention. Computing system 100 may include a network 102, a plurality of computing devices, which may generally include any type of computer system based on a microprocessor or an application-specific integrated circuit (ASIC). In some embodiments, computing system 100 may include a production server 104, a backup server 106, a plurality of clone servers 108, and a client device 110 associated with a user 112.

Production server 104 may represent a node on network 102 that includes functionality to service requests from backup server 106, clone server 108, and/or client device 110. Further, production server 104 may include a production database 114 that, for example, may store data for an application. For example, client device 110 may use a Web browser at client device 110 to view and interact with a Web page hosted by production server 104.

Similarly, backup server 106 may represent a node on network 102 that includes a backup database 116 which is a backup copy of production database 114.

Clone servers 108 may represent a node on network 102 that includes functionality to service requests in a similar way as production server 104. Further, clone servers 108 (e.g., clone server 108.1, 108.2., and 108.n) may include a plurality of clone databases (e.g., clone databases 118 at clone server 108.1). An individual clone database (e.g., clone database 118.1, 118.2, and 118.n) may correspond to a clone space that may be used to process database commands from client device 110, and may store data blocks from backup database 116 that have been modified by client device 110.

In some embodiments, user 112 may use client device 110 to execute an application that generates database queries for multiple copies of an application database. For example, client device 110 may include a programming environment used by user 112 to develop an application, and to test experimental versions of the application. In some embodiments, user 112 may desire to test the latest experimental version of the application against information stored at production database 114 without altering production database 114. Thus, user 112 may create a plurality of clone databases (e.g., clone databases 118) based on backup database 116 to run a plurality of test scripts.

Clone server 108.1 may perform thin provisioning on a clone database to store information that has been modified from backup database 116. Further, clone server 108.1 may implement copy-on-write, at the database level (e.g., at the I/O layer of a database management system (DBMS)), and thus does not require the use of a snapshot function from an underlying storage device of backup server 106 or clone server 108.1.

In some embodiments, the I/O layer of the DBMS at clone server 108.1 may receive and process a database command that includes an access operation (e.g., a read or a write operation) for a data block that is not stored in the local clone space (e.g., the local storage space of clone server 108.1). To process this database command, the I/O layer of the DBMS at clone server 108.1 may generate a request to access the desired data block at backup database 116 at backup server 106. Thus, the thin provisioning and copy-on-write features of the DBMS at clone server 108.1 do not require client device 110 and/or backup server 106 to implement special database commands. Client device 110 may interface with clone server 108.1 using typical database commands that would be supported by a typical database server (e.g., production server 104). Further, backup database 116 and production database 114 can be typical databases that are managed by a typical DBMS, and backup server 106 and/or production server 104 are not required to implement additional hardware and/or software functions.

For example, clone server 108.1 may receive a database command for clone database 118.1 (e.g., resulting from client device 110 executing a corresponding test script), that may request information from a data block that is not stored at the local clone space of clone database 118.1. Clone server 108.1 may process the request to determine whether the desired data block is stored in the local clone space, and may obtain this data block from backup database 116 to fulfill the request without storing this data block in the local clone space. Further, if the database command modifies the data block, clone server 108.1 may store the modified data block in the local clone space without changing the corresponding data block in backup database 116.

Figure 2:
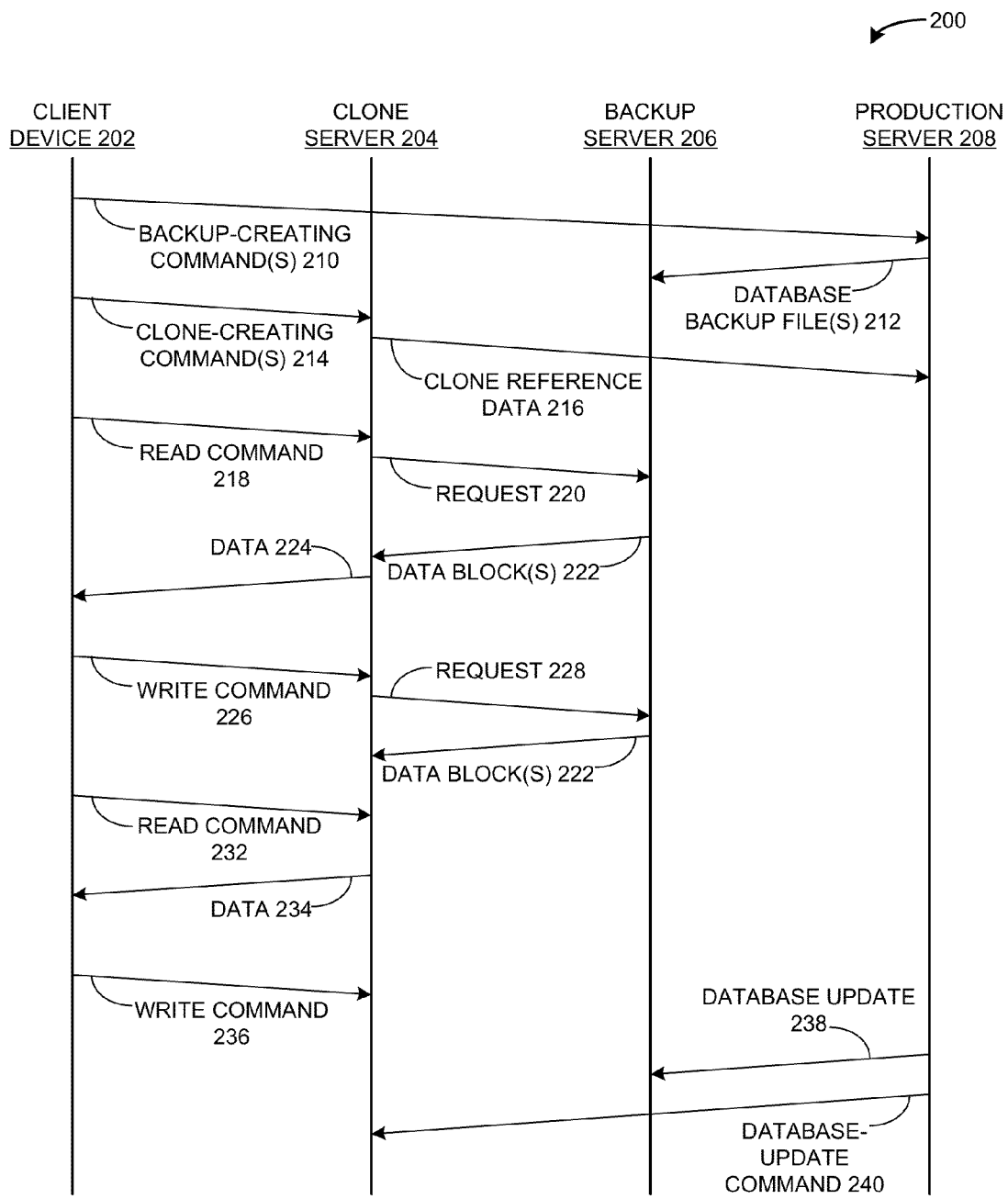
FIG. 2 illustrates exemplary communications between components of the computing system in accordance with an embodiment of the present invention.

FIG. 2 illustrates exemplary communications 200 between components of computing system 100 in accordance with an embodiment of the present invention. During operation, a user may create the backup database(s) at a backup server 206 by sending backup-creating command(s) 210 (e.g., using a client device 202) to a production server 208. Backup-creating command(s) 210, for example, may include commands for the Oracle® Recovery Manager (RMAN) tool.

A production server 208 may process commands 210 to upload database backup file(s) 212 to backup server 206. Also, production server 208 may store a reference to and/or access information for the backup database (e.g., a reference to database backup file(s) 212) at backup server 206. Production server 208 can use these references to send (e.g., periodically) a database update 238 to backup server 206. For example, production server 208 can provide backup server 206 with commands (e.g., a migration script and/or a configuration script) that it may use to modify the backup database(s) so that they are up to date with the production database(s). As another example, production server 208 can provide backup server 206 with a recent backup copy of the production database file(s) to replace the backup database file(s) at backup server 206.

The user can subsequently create clone database(s) at a clone server 204 by sending clone-creating command(s) 214 from client device 202 to clone server 204. Clone server 204 can process commands 214 to create the clone database(s), which are clone(s) of the backup database. In some embodiments, clone server 204 may send clone reference data 216 to production server 208. Production server 208 may use these references, when it updates the backup database(s) at backup server 206, to send database-update command(s) 240 to clone server 204 to clear the clone space of the clone database(s).

Clone-creating command(s) 214 cause clone server 204 to create one or more thin-provisioning databases that clone an existing backup database. Clone server 204 maintains in a clone space one or more data blocks that have been modified from the backup database, and may not include a data block of the backup database which has not been updated in the clone space. Thus, clone server 204 consumes a minimal amount of disk space while maintaining the clone database.

Subsequently, clone server 204 may receive a read command 218 from client device 202 for accessing a record of the database that clone server 204 has not stored in the local clone space. Read command 218 may include, for example, a database query for obtaining records (e.g., a SQL SELECT statement). Clone server 204 may process command 218 by sending a request 220 to backup server 206 to obtain the data block(s) 222, which are not stored in the clone database. Clone server 204 then provides client device 202 with data 224, which includes records from data block(s) 222, without storing data block(s) 222 in the local clone space.

Clone server 204 may also receive a write command 226 from client device 202 for updating data block(s) 222. Write command 226 may include, for example, a database command for updating or inserting a record into the database (e.g., a SQL UPDATE statement). Because data block(s) 222 are not stored in the local clone space, clone server 204 may process command 226 by sending a request 228 to backup server 206 to obtain data block(s) 222, which are not stored in the local clone space.

Further, clone server 204 may receive a read command 232 from client device 202 for accessing data 234 which includes modified data block(s) 222. In response, clone server 204 retrieves locally stored data block(s) 222 and provides data 234 to client device 202.

Clone server 204 may also receive a write command 236 from client device 202 for updating data block(s) 222 which is stored in the clone space, or for writing to a new data block that does not exist in the clone database. Write command 236 may include, for example, a SQL UPDATE or INSERT statement. Clone server 204 may process command 236 by updating and/or inserting the corresponding data blocks in the local clone space, without updating and/or inserting corresponding data blocks at the backup database.

Figure 3:
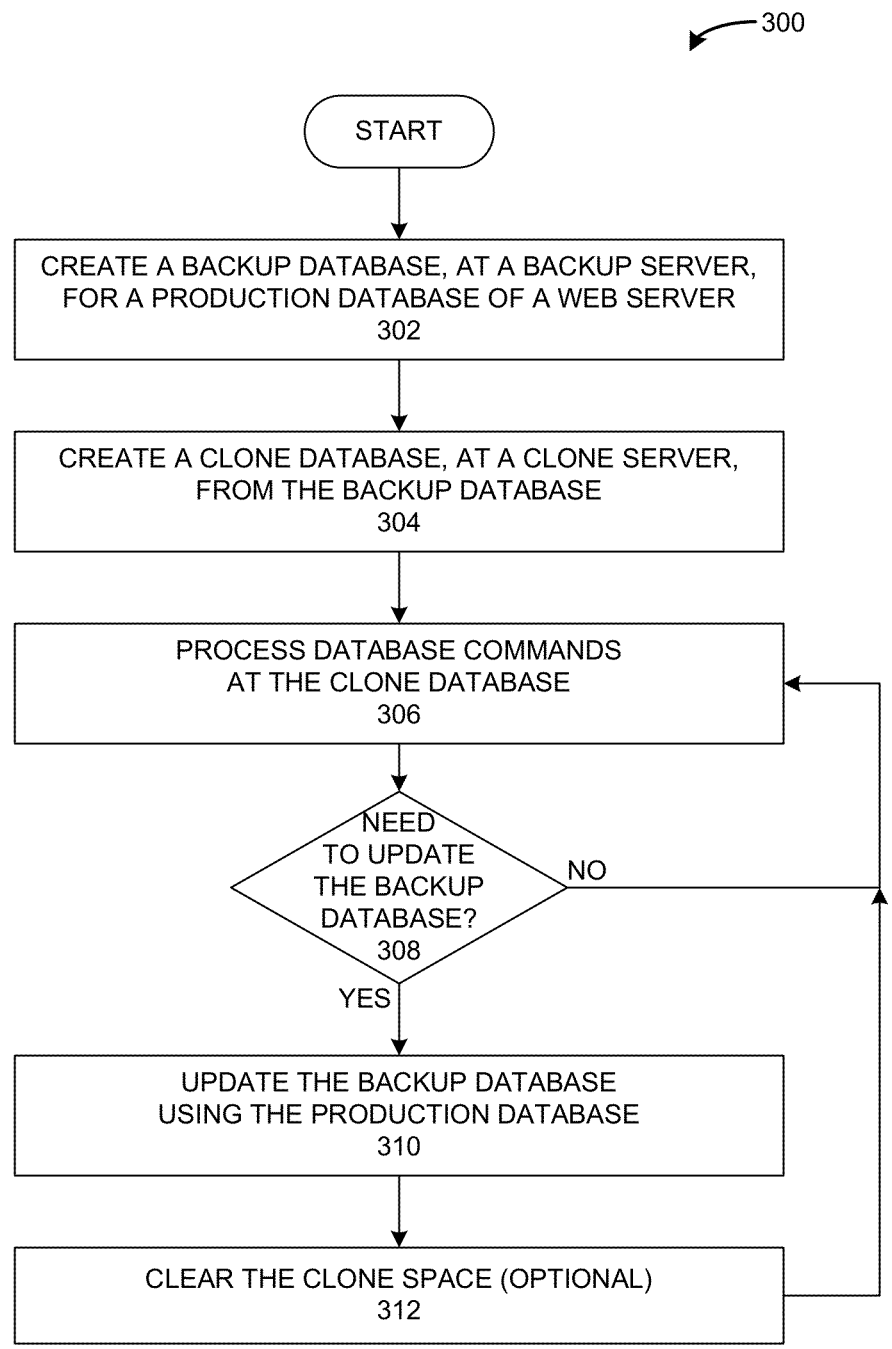
FIG. 3 presents a flowchart illustrating an exemplary process for creating and maintaining a clone database in accordance with an embodiment of the present invention.

FIG. 3 presents a flowchart illustrating an exemplary process 300 for creating and maintaining a clone database in accordance with an embodiment of the present invention. During operation, the system creates a backup database, at a backup server, for a production database (operation 302). Subsequently, the system creates a clone database, at a clone server, from the backup database (operation 304). The user may, for example, use a client device to interface with the clone server to create the clone database. Note that the local clone space of the clone database does not store a data block of the backup database that has not modified by the clone database.

Next, the system processes database commands at the clone database (operation 306). The clone server, for example, may process database commands that access a data block which has not been modified at the clone server. If the database operation does not modify the accessed data block, the clone server sends the accessed database record to the client device without storing the corresponding data block(s) in the local clone space. Further, the clone server may store or load, at the local clone space, data blocks that have been updated.

Following operation 306, the system then determines whether the backup database is to be updated (operation 308). In some embodiments, the system may periodically update the backup database at the backup server by uploading a backup copy of the production database to the backup server. In addition, a user may cause production server to transfer a new backup copy of the production database to the backup server.

If the system determines that the backup database is not to be updated, the system may return to operation 306 to process more database commands. However, if the system determines that the backup database is to be updated, the system updates the backup database (operation 310), and may optionally clear the clone space at the clone servers (operation 312).

Further, the system may perform operation 312 to remove data blocks stored in the local clone space so that the clone database can receive new or updated data blocks of the backup database. In some embodiments, the system may perform operation 312 by de-allocating or clearing data blocks stored in the local clone space, and clearing filter arrays of a Bloom filter for the local clone space (discussed in more detail below with respect to FIGS. 5 and 6). The system can also destroy the existing clone database and create a new clone database from the updated backup database.

Figure 4:
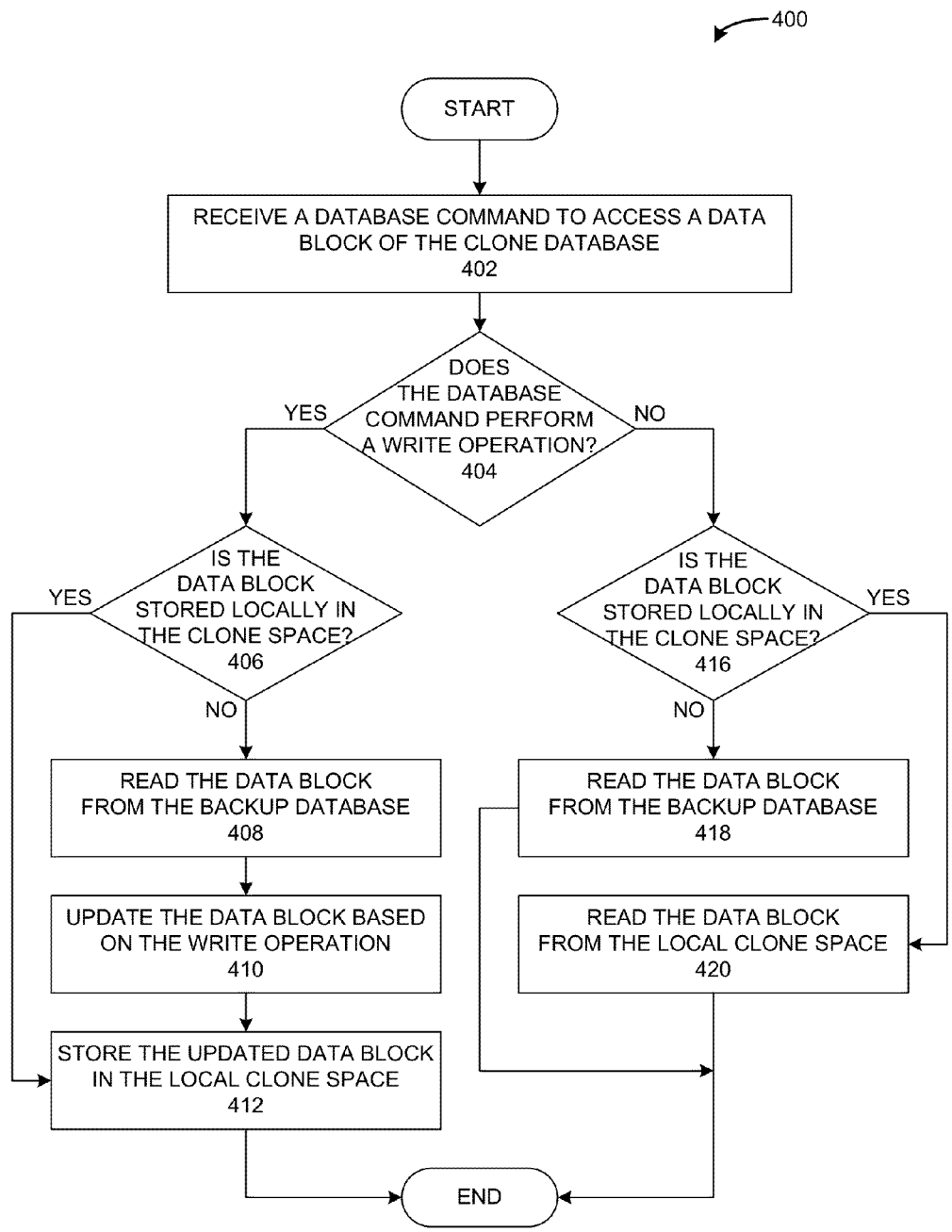
FIG. 4 presents a flowchart illustrating an exemplary process for processing a database command using a clone database in accordance with an embodiment of the present invention.

FIG. 4 presents a flowchart illustrating an exemplary process 400 for processing a database command using a clone database in accordance with an embodiment of the present invention. In some embodiments, a clone server may perform process 400 at the database level (e.g., at the I/O layer of a DBMS) to implement a copy-on-write transaction for data blocks of the backup database. As a result, the clone server does not require the use of a snapshot function from an underlying storage device.

During operation, a clone server receives a database command to access a data block of the clone database (operation 402). The clone server then determines whether the database command includes a write operation (operation 404). If so, the clone server further determines whether the data block is stored in the local clone space (operation 406). If the data block is not stored in the local clone space, the clone server reads the data block from a backup database (operation 408), and updates the data block based on the write operation (operation 410). Subsequently, the clone server stores the updated data block in the local clone space (operation 412). If the clone server determines, at operation 406, that the data block is already stored in the clone space, the clone server proceeds to operation 412 to perform the write operation on the data block in the local clone space.

If the clone server determines, at operation 404, that the database command does not perform a write operation, clone server 108.1 may continue to determine whether the data block is stored in the local clone space (operation 416). If so, clone server 108.1 may continue to operation 420 to read the data block from the local clone space (operation 420). Otherwise, clone server 108.1 may read the data block from the backup database without storing the data block in the local clone space (operation 418).

Bloom Filter Processing

In some embodiments, the clone server may use a Bloom filter to determine whether a data block is stored in the local clone space. A data block of the backup database may be associated with a plurality of bit positions of the Bloom filter that together may indicate whether the desired data block is stored in the local clone space.

As described above, a data block is stored in the local clone space when it is modified. However, when executing a read operation (or any operation that requires access to a data block), the clone server needs to determine whether the data block is stored locally in the clone space. If it is in the local clone space, the data block is accessed locally. Otherwise, the data block is fetched from the backup database.

In one embodiment, the clone server uses a Bloom filter to record and determine whether a data block is stored locally. A Bloom filter is a space-efficient data structure typically used to determine whether an element (e.g., a data block) is a member of a set (e.g., the set of the data blocks stored locally in the clone space). With a Bloom filter, false positives are possible, but false negatives are not. An empty Bloom filter is a bit array of m bits, all set to 0. There are also k different hash functions, each of which maps or hashes a respective element (e.g., a data block) to one of the m array positions with a uniform random distribution. In this disclosure, each data block is considered to be an element. The "set" is the set of data blocks that are stored locally in the clone space. Hence, the problem of determining whether a data block is stored locally is equivalent to determining whether an element is a member of the set.

To add an element to the set (e.g., when a data block is stored locally), the system feeds some element-unique information to each of the k hash functions to obtain k array positions. The system subsequently sets the bits at all these positions to 1.

To test whether an element is in the set, the system feeds some element-unique information to each of the k hash functions to obtain k array positions. If any of the bits at these positions are 0, the element is not in the set—if it were, then all the bits would have been set to 1 when it was inserted to the set. If all are 1, then either the element is in the set, or the bits have been set to 1 during the insertion of other elements (which is a false positive).

Figure 5:
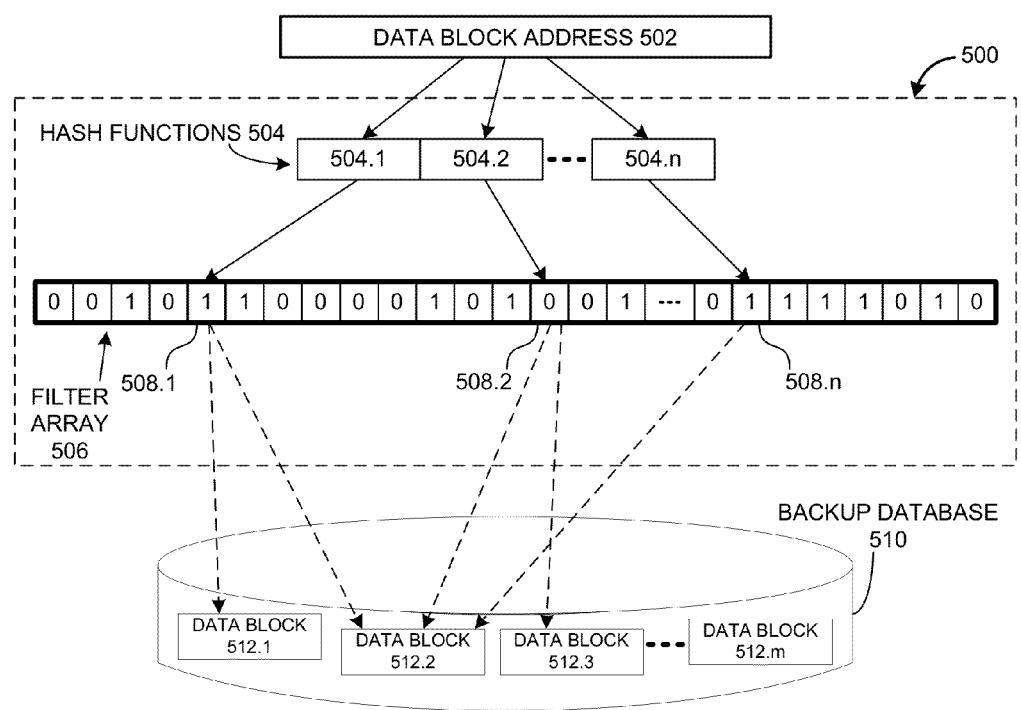
FIG. 5 presents a flowchart illustrating an exemplary process for determining whether a data block is stored in the local clone space of the clone database in accordance with an embodiment of the present invention.

FIG. 5 illustrates an exemplary Bloom filter 500 in accordance with an embodiment of the present invention. Bloom filter 500 may include a plurality of hash functions 504 and a filter array 506. Further, a hash function of Bloom filter 500 (e.g., hash function 504.1, 504.2, or 504.n of hash functions 504) may receive a data block address 502 as input. Data block address 502 may, for example, be an integer value corresponding to a desired data block. In some embodiments, hash functions 504 may receive a filename for the clone database and a block number for the desired data block as input.

Filter array 506 includes a plurality of bit positions that may be used to determine which data blocks of backup database 510 are stored in the local clone space. An individual bit position (e.g., bit position 508.1, 508.2, or 508.n) may be associated with one or more data blocks of backup database 510 (e.g., data blocks 512.1, 512.2, 512.3, and 512.m). Further, a data block of backup database 510 may be associated with a plurality of bit positions. For example, bit position 508.1 may be associated with data blocks 512.1 and 512.2 of backup database 510, and bit position 508.2 may be associated with data blocks 512.2 and 512.3 of backup database 510.

The clone server determines whether data block 512.2 of backup database 510 is stored in the local clone space by entering data block address 502 corresponding to data block 512.2 as input to hash functions 504. Further, the output of hash functions 504 may indicate that data block 512.2 is associated with bit positions 508.1-508.n. Filter array 506 indicates, at bit positions 508.1-508.n, whether the data block is stored in the local clone space. If at least one of bit positions 508.1-508.n indicates (e.g., by storing a 0) that data block 512.2 is not stored in the local clone space, the clone server determines that data block 512.2 is not stored in the local clone space.

In some embodiments, the clone server may update a database record associated with data block 512.2, at which point the clone server may store the modified data block 512.2 in the local clone space. The clone server also modifies bit positions 508.1-508.n (e.g., by setting the values at these bit positions to 1) to indicate that data block 512.2 is stored in the local clone space. For example, clone server 108.1 may modify bit position 508.2 by replacing the 0 value with a 1.

Note that in Bloom filter 500, bit position 508.2 is also associated with data block 512.3 of backup database 510. Therefore, because bit position 508.2 has been set to a 1 for data block 512.2, it is a possibility that the set of bit positions of filter array 506 associated with data block 512.3 may now indicate a false-positive. These bit positions for data block 512.3 may all store a 1, which would indicate incorrectly that data block 512.3 is stored in the local clone space. The clone server can determine whether a positive result obtained from Bloom filter 500 is a false positive by analyzing data block 512.3 stored in the local clone space to determine whether the stored data block is valid.

In some embodiments, the clone server may perform a lazy update of the bit position values for filter array 506. The clone server may store a copy of filter array 506 in the memory and a second copy on a disk. When the clone server updates a data block in the local clone space, the clone server may first update the corresponding bit position values for the filter array stored in memory, and may periodically propagate these updated bit position values to the copy stored on the disk. For example, the clone server may delay updating the bit position values stored in the disk copy for a determinable time period (e.g., an hour). As another example, the clone server may delay updating the bit position values stored in the disk copy until a determinable number of bit positions are to be updated (e.g., five bit positions of filter array 506). Thus, the clone server may not update these bit positions in the disk copy of the array after every update to a data block in the local clone space. Note that the memory copy of array 506 is always updated in real time.

In some embodiments, the clone server corrects inconsistencies between the set values in filter array 506 and the data blocks stored in the local clone space to recover data block(s) whose corresponding bit positions of filter array 506 may indicate a false-negative. For example, it may be possible that the clone server shuts down (e.g., due to a server crash or a power failure) before filter array 506 is updated to indicate that a data block has been stored in the local clone space. Thus, the clone server can perform a recovery process to correct these inconsistencies during a database instance startup process (e.g., when the clone server is booting or rebooting). Further, the clone server may perform other updates to the local clone space and/or filter array 506 in parallel to the recovery process. During the recovery process (e.g., while filter array 506 is being corrected), the clone server may determine whether a data block is stored in the local clone space by performing a block check on the data block at the clone server.

Figure 6:
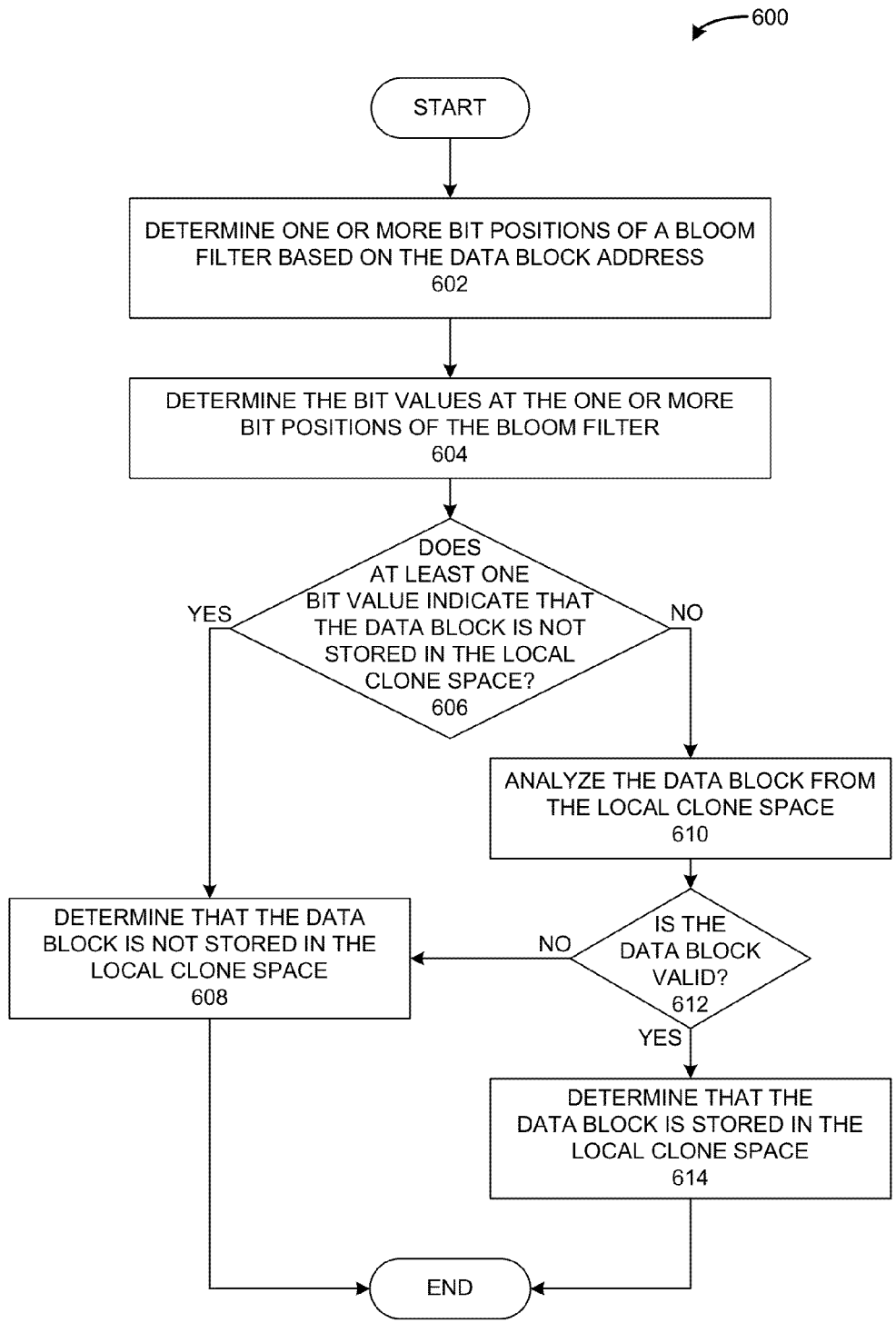
FIG. 6 illustrates an exemplary Bloom filter in accordance with an embodiment of the present invention.

FIG. 6 presents a flowchart illustrating an exemplary process 600 for determining whether a data block is stored in the local clone space of the clone database in accordance with an embodiment of the present invention.

During operation, the clone server determines one or more bit positions of a Bloom filter that correspond to a data block being accessed (operation 602). For example, the clone server may use a data block address (DBA) as input into one or more hash functions. The, clone server then determines the positions based on the outputs of these hash functions. Next, the clone server determines the bit values at these bit positions of the Bloom filter (operation 604).

The clone server then determines whether at least one bit value indicates that the data block is not stored in the local clone space (operation 606). In some embodiments, a logic zero value at any of the bit positions may indicate that the desired data block is not stored in the local clone space, and a logic one value at all of the bit positions may indicate that the data block is stored in the local clone space of the data block.

If at least one bit value indicates that the data block is not stored in the local clone space, the clone server can determine that the desired data block is not stored in the local clone space (operation 608). Otherwise, the clone server may perform a block check operation to verify that the data block of the local clone space is actually the intended block. For example, it may be possible that the Bloom filter bit values for this data block may have been set for other data blocks of the local clone space that are also associated with the same bit positions. Thus, a result produced by the Bloom filter might be a false positive. To perform the block check operation, the clone server may analyze the data block from the local clone space (operation 610), and determine whether the locally stored data block is a valid data block by, for example, comparing the DBAs of the local data block and the intended data block (operation 612).

If the clone server determines at operation 612 that the locally stored data block is not a valid data block, the clone server can determine that the desired data block is not stored in the local clone space (operation 608). Otherwise, the clone server can determine that the desired data block is stored in the local clone space (operation 614). In some embodiments, determining that the desired data block is not stored in the local clone space (e.g., operation 608) may cause the clone server to read the data block from the backup database.

Figure 7:
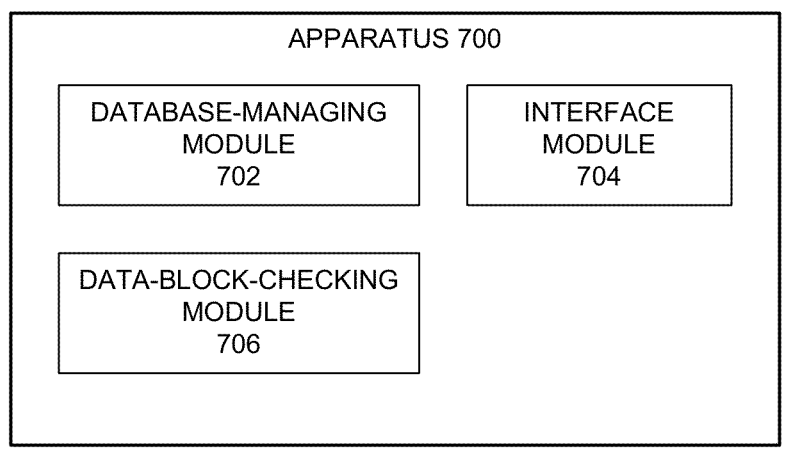
FIG. 7 illustrates an exemplary apparatus that facilitates maintaining a clone database in accordance with an embodiment of the present invention.

FIG. 7 illustrates an exemplary apparatus 700 that facilitates maintaining a clone database in accordance with an embodiment of the present invention. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a database-managing module 702, an interface module 704, and a data-block-checking module 706.

In some embodiments, database-managing module 702 may maintain a clone database in a clone space without storing an entire copy of the database, and without requiring a snapshot function from an underlying storage device. Interface module 704 may be configured to receive a database command for accessing a data block of the database. Further, data-block-checking module 706 may be configured to determine whether the data block is stored in the clone space. Moreover, database-managing module 702 may configure interface module 704 to receive the data block from a backup copy of the database if the data block is not stored in the local clone space.

Figure 8:
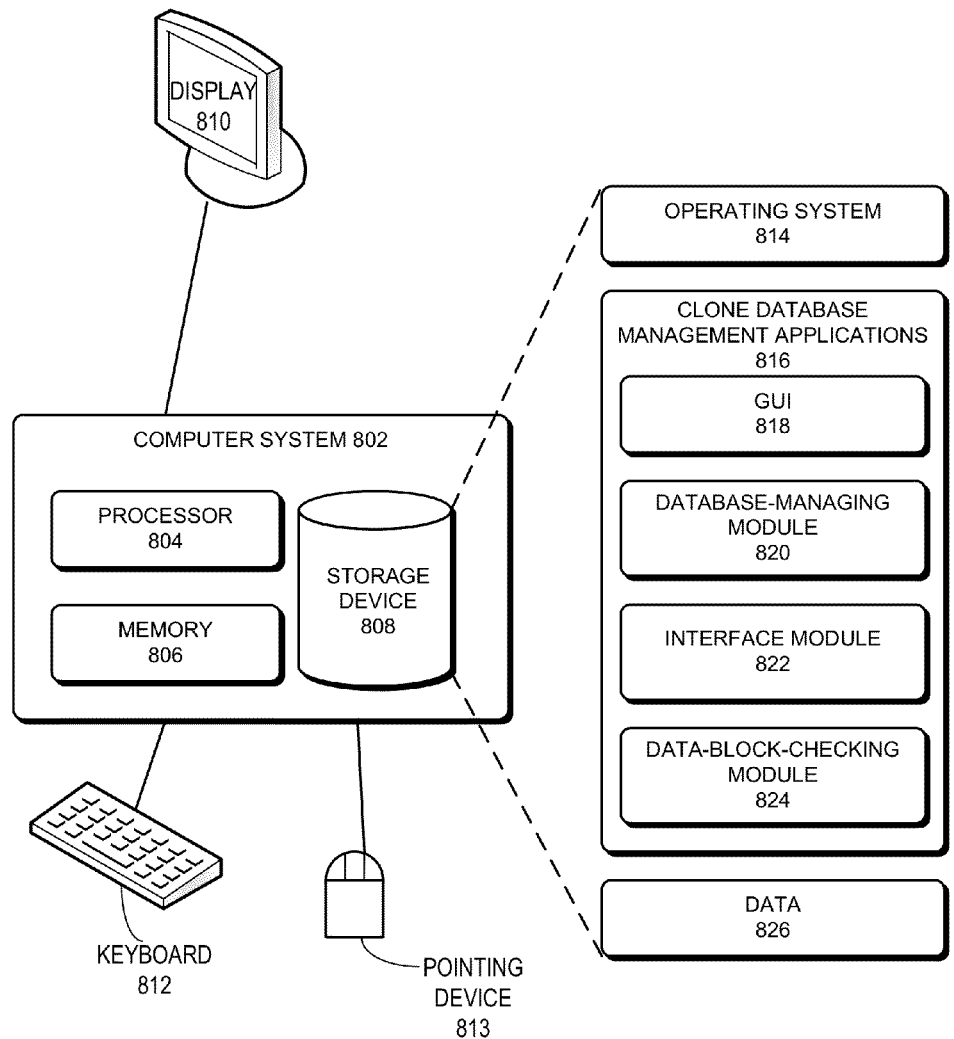
FIG. 8 illustrates an exemplary computer system that facilitates maintaining a clone database in accordance with an embodiment of the present invention.

FIG. 8 illustrates an exemplary computer system 802 that facilitates maintaining a clone database in accordance with an embodiment of the present invention. Computer system 802 includes a processor 804, a memory 806, and a storage device 808. Furthermore, computer system 802 can be coupled to a display device 810, a keyboard 812, and a pointing device 813. Storage device 808 can store operating system 814, clone database management applications 816, and data 826.

Applications 816 can include instructions, which when executed by computer system 802, can cause computer system 802 to perform methods and/or processes described in this disclosure. Specifically, applications 816 may include instructions for maintaining a clone database in a clone space without storing an entire copy of the database, and without requiring a snapshot function from an underlying storage device (database-managing module 820). Further, applications 816 may include instructions for receiving a database command for accessing a data block of the database (interface module 822). Applications 816 may also include instructions for determining whether the data block is stored in the clone space (data-block-checking module 824), which may cause interface module 822 to receive the data block from a backup copy of the database if the data block is not stored in the local clone space.

Data 826 can include any data that is required as input or that is generated as output by the methods and/or processes described in this disclosure. Specifically, data 826 can store at least a clone database, hash functions for a Bloom filter, filter arrays for the Bloom filter, and access information for a database, or for a backup copy of the database.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:
1. A method comprising:
   maintaining, by a processor, a clone database in a clone space without storing an entire copy of the database and without requiring a snapshot function from an underlying storage device;
   receiving a database command to access a data block of the clone database;

determining that the data block is not stored in the clone space;
receiving the data block, which corresponds to the database command for the clone database, from a backup copy of the database without storing the data block in the clone space; and
in response to the database command comprising a write operation:
performing the write operation to update the data block; and
storing the updated data block in the clone space.

2. The method of claim 1, further comprising:
in response to the database command comprising a read operation, performing the read operation on the data block received from the backup copy of the database.

3. The method of claim 1, wherein the determining that the data block is not stored in the clone space comprises:
determining a number of bit positions of a Bloom filter based on an address for the data block; and
determining that the Bloom filter indicates, at the bit positions, that the data block is not stored in the clone space.

4. The method of claim 3, wherein the storing the data block comprises setting the Bloom filter, at the bit positions, to a value indicating that the updated data block is stored in the clone space.

5. The method of claim 1, wherein maintaining the clone database comprises:
receiving a cloning command to create the clone database, the cloning command indicating a name for the clone database and access information for the database; and
including in the clone database a reference to the database.

6. The method of claim 1, wherein the clone space is maintained without relying on storage-specific commands provided by the underlying storage device.

7. The method of claim 1, wherein the clone space resides on a computer system which is separate from a computer system where the backup copy of the database resides.

8. A non-transitory computer-readable storage medium storing instructions that when executed by a computer cause the computer to perform a method, the method comprising:
maintaining, by a processor, a clone database in a clone space without storing an entire copy of the database and without requiring a snapshot function from an underlying storage device;
receiving a database command to access a data block of the clone database;
determining that the data block is not stored in the clone space;
receiving the data block, which corresponds to the database command for the clone database, from a backup copy of the database without storing the data block in the clone space; and
in response to the database command comprising a write operation:
performing the write operation to update the data block; and
storing the updated data block in the clone space.

9. The computer-readable storage medium of claim 8, further comprising:
in response to the database command comprising a read operation, performing the read operation on the data block received from the backup copy of the database.

10. The computer-readable storage medium of claim 8, wherein the determining that the data block is not stored in the clone space comprises:
determining a number of bit position of a Bloom filter based on an address for the data block; and
determining that the Bloom filter indicates, at the bit positions, that the data block is not stored in the clone space.

11. The computer-readable storage medium of claim 10, wherein the storing the data block comprises setting the Bloom filter, at the bit positions, to a value indicating that the updated data block is stored in the clone space.

12. The computer-readable storage medium of claim 8, wherein maintaining the clone database comprises:
receiving a cloning command to create the clone database, the cloning command indicating a name for the clone database and access information for the database; and
including in the clone database a reference to the database.

13. The computer-readable storage medium of claim 8, wherein the clone space is maintained without relying on storage-specific commands provided by the underlying storage device.

14. The computer-readable storage medium of claim 8, wherein the clone space resides on a computer system which is separate from a computer system where the backup copy of the database resides.

15. An apparatus comprising:
a processor;
a memory;
a database-managing module to maintain a clone database in a clone space without storing an entire copy of the database and without requiring a snapshot function from an underlying storage device;
an interface module to receive a database command to access a data block of the clone database;
a data-block-checking module to determine that the data block is not stored in the clone space, the interface module being further configured to receive the data block, which corresponds to the database command for the clone database, from a backup copy of the database without storing the data block in the clone space; and
in response to the database command comprising a write operation, the database-managing module being further configured to:
perform the write operation to update the data block; and
store the updated data block in the clone space.

16. The apparatus of claim 15, further comprising:
in response to the database command comprising a read operation, the database-managing module being further configured to perform the read operation on the data block received from the backup copy of the database.

17. The apparatus of claim 15, wherein the determining that the data block is not stored in the clone space comprises:
determining a number of bit position of a Bloom filter based on an address for the data block; and
determining that the Bloom filter indicates, at the bit positions, that the data block is not stored in the clone space.

18. The apparatus of claim 17, wherein the storing the data block comprises setting the Bloom filter, at the bit positions, to a value indicating that the updated data block is stored in the clone space.

19. The apparatus of claim 15, wherein the maintaining the clone database comprises:
receiving a cloning command to create the clone database, the cloning command indicating a name for the clone database and access information for the database; and
including in the clone database a reference to the database.

20. The apparatus of claim 15, wherein the clone space is maintained without relying on storage-specific commands provided by the underlying storage device.

21. The apparatus of claim 15, wherein the clone space resides on a computer system which is separate from a computer system where the backup copy of the database resides.

\* \* \* \* \*